United States Patent

[11] 3,581,100

[72] Inventor Richard E. Milford
Phoenix, Ariz.
[21] Appl. No. 764,890
[22] Filed Oct. 3, 1968
[45] Patented May 25, 1971
[73] Assignee Honeywell Information Systems Inc.

[54] OPTICAL READING DEVICE
4 Claims, 4 Drawing Figs.

[52] U.S. Cl. ........................................ 250/216, 250/219, 250/227
[51] Int. Cl. ........................................ G08c 9/06
[50] Field of Search ........................................ 250/219 (DC), 219 (D), 239, 227; 235/61.11 (A); 356/199, 200, 237

[56] References Cited

UNITED STATES PATENTS

| | | | |
|---|---|---|---|
| 2,916,624 | 12/1959 | Angel et al. | 250/239X |
| 3,046,407 | 7/1962 | Hoffman | 250/219 |
| 3,053,986 | 9/1962 | Loepfe et al. | 250/239X |
| 3,081,403 | 3/1963 | Etzrodt, Jr. et al. | 250/239 |
| 3,105,908 | 10/1963 | Burkhardt et al. | 250/219 |
| 3,185,853 | 5/1965 | Jackson | 250/239 |
| 3,255,047 | 6/1966 | Escoffery | 250/239X |

*Primary Examiner*—Walter Stolwein
*Attorneys*—George V. Eltgroth, Frank L. Neuhauser, Oscar B. Waddell, Melvin M. Goldenberg, Edward W. Hughes and George R. Powers

ABSTRACT: An optical read head for record-reading electronic equipment which senses and generates signals in response to marks on documents as the documents are transported along a given path.

INVENTOR.
RICHARD E. MILFORD

OPTICAL READING DEVICE

BACKGROUND OF THE INVENTION

This invention relates to record-reading devices and more specifically to an optical read head for sensing and generating signals in response to marks on a document.

1. Field of the Invention

In high-speed data processing systems, information processed by the system is supplied from external sources such as, for example, magnetic tapes, punched cards and the like. An information source most closely related to the instant invention is the utility companies' record card or document on which the current month's meter reading is recorded by pencil or pen marks placed in appropriate locations. The documents may have different formats designed to serve their intended uses. The documents, after being marked by the meter reader, are placed into record-reading equipment which scans the documents, converts the information read into electrical signals, and transmits the signals to a data processing system. The data processing system then updates the customer's accounts by utilizing techniques well known in the art.

Documents of this type generally employ a format similar to that of punched cards, that is, a plurality of vertical columns and horizontal rows. The intersection of each column and row is appropriately identified so that information is recorded by placing manmade marks at appropriate intersections. The record-reading equipment normally employed transports the documents past a reading station in such a manner that all intersections, which occur in a particular column, are sensed by a read head simultaneously.

2. Description of the Prior Art

Mark-read heads of prior art devices are characterized by excessive bulk and a complicated design which requires frequent maintenance and adjustment.

The typical mark-read head of the prior art devices utilizes a bank of incandescent lamps with each lamp being provided with a calibrating device, such as a potentiometer. The lamps are positioned to radiate light through one or more lenses for focusing light rays onto discrete areas of a document. A bank of light-sensitive elements is arranged with one element in alignment with each lamp, the elements being positioned to sense the amount of light reflected by the illuminated areas and to generate a signal representative thereof. The presence or absence of a mark in the illuminated area governs the amount of light that is reflected, and thus determines the output signal of the light-sensitive elements.

The prior art mark-read heads require constant surveillance to insure against lamp burnout and frequent adjustment of the lamp calibrating devices to insure uniform illumination of the marking areas. These known mark-read heads sense both specular and diffuse-reflected light, thus resulting in misreadings, at times, of documents with glossy or specularly reflective surfaces or marks. Dust and foreign material also collect on the lenses and the light-sensitive elements of these known devices which reduce the sensitivity of the read heads.

SUMMARY OF THE INVENTION

In accordance with the invention claimed, a new and improved mark-read head is provided which utilizes a single lamp and a completely enclosed dust-free optical focusing and sensing system.

A unitary lens is used to condense and focus light onto a document so that the angle of incidence is acute and parallel to the direction of motion of the document. The light-sensitive elements are mounted within the angle included between the incident light beam and the specularly reflected light beam, and are thus shielded from both. Therefore, these elements will respond only to the light that is diffusely reflected from the document, thereby overcoming the problems of misreadings resulting from specularly reflective surfaces or marks.

The use of larger light-sensitive elements having relatively high output signal levels than that used in the prior art is now possible due to the manner in which the light is directed onto the document and the unique positioning of the light-sensitive elements. This arrangement makes it possible to shield more effectively stray and unwanted direct radiation from associated light sources.

Accordingly, it is an object of this invention to provide an improved optical read head.

Another object of this invention is to provide an improved optical focusing and sensing system which is substantially dust free.

A further object of this invention is to provide an improved optical read head employing light-sensing elements having relatively high level output signals.

A still further object of this invention is to provide an improved optical read head which senses diffuse-reflected light from the surface of the document being read.

A still further object of this invention is to provide an improved optical read head which employs a single light source.

A still further object of this invention is to provide light-sensitive elements which are shielded from adjacent illuminated areas.

The foregoing and other objects of this invention, the various features thereof, as well as the invention itself, may be more fully understood from the following description when read in conjunction with the accompanying drawings.

DESCRIPTION OF THE PREFERRED EMBODIMENT

Figures 1, 2, 3:
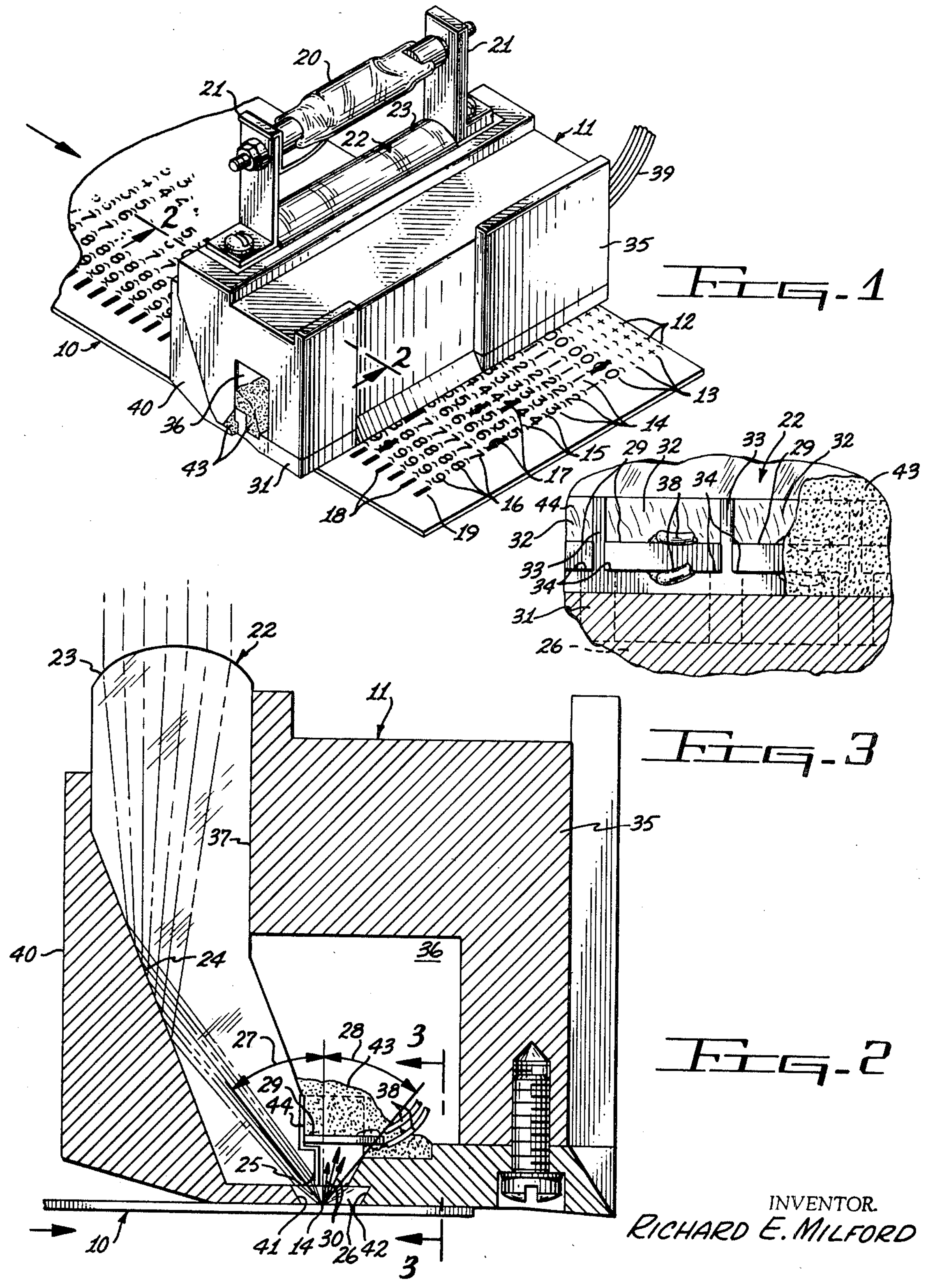
FIG. 1 is a perspective view of a document and mark-read head incorporating the features of the present invention.
FIG. 2 is an enlarged sectional view of FIG. 1 taken on the line 2–2.
FIG. 3 is a fragmentary sectional view of FIG. 2 taken on the line 3–3.

Referring more particularly to the drawings by characters of reference, FIG. 1 illustrates a document 10 of the type that may be read by a mark-read head 11 employing the novel concepts of the claimed invention.

Document 10 may vary in format according to its intended use, but will generally include the features and characteristics as illustrated and hereinafter described. The document is provided with a plurality of vertically arranged columns 12 and horizontally arranged rows 13, the intersections of which provide marking areas 14. The marking areas are located with carets 15 and identified with numerals or characters 16 to assist the document user in placing the pencil or pen marks 17 in proper locations. The printing of carets 15 and characters 16 may be done in a screened pattern (small dots) and in a high-reflectance color so as not to interfere with the sensing of marks 17 by mark-read head 11. A low-reflectance mark 18 is arranged in an additional row 19 and in alignment with each column 12 and is used to generate a timing signal.

Figure 4:
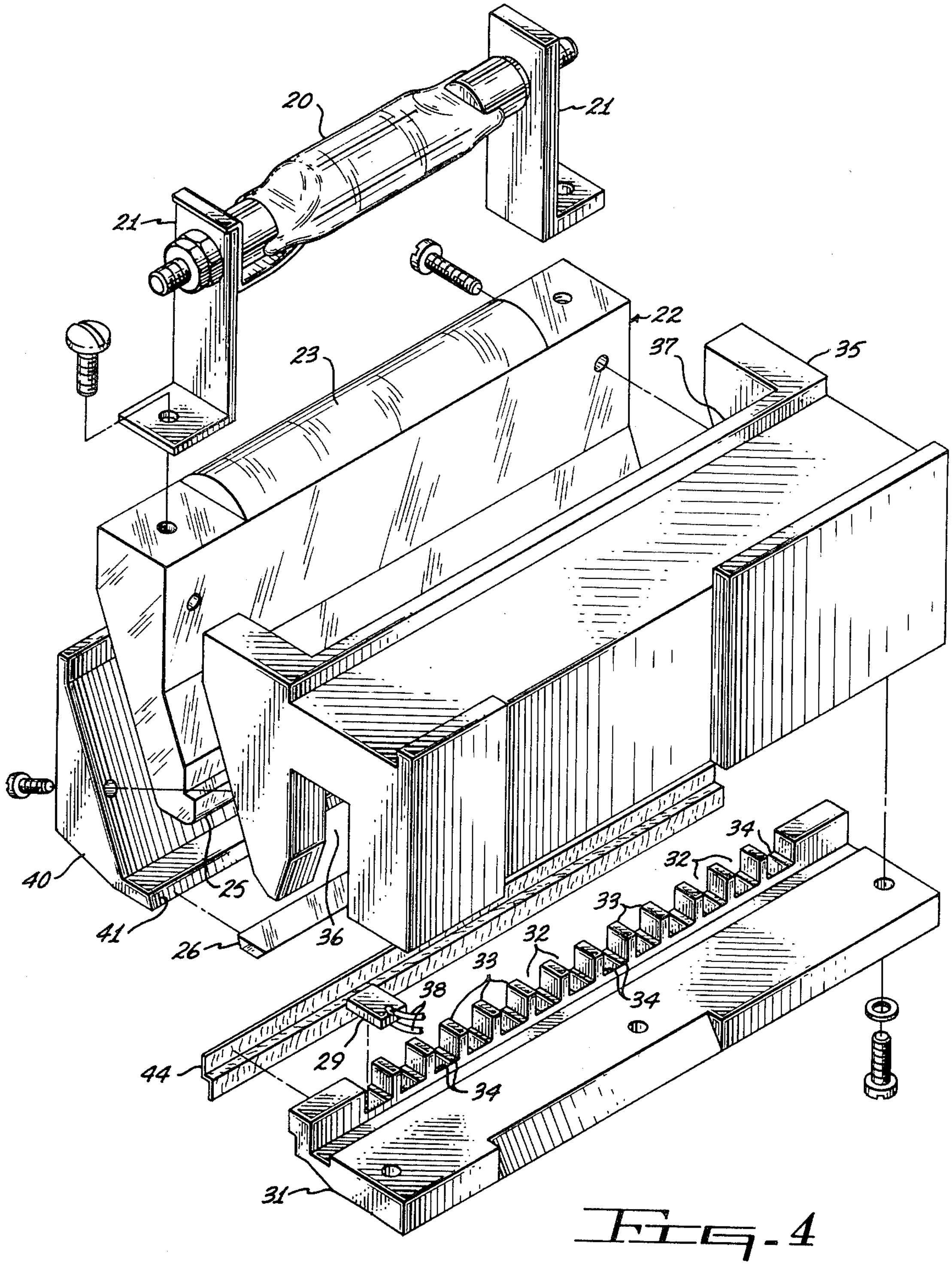
FIG. 4 is an exploded view of the mark-read head shown in FIG. 1.

The mark-read head 11, as best seen in FIGS. 1, 2 and 4, comprises a light source in the form of a single lamp 20 suitably mounted on brackets 21 adjacent to a unitary lens 22. Lens 22 is an elongated member made of any suitable optically clear material and is provided with a cylindrical light-receiving lens surface 23, an angularly disposed internal reflective surface 24 and a cylindrical light-dispersing lens surface 25. Each of these surfaces extends longitudinally of the elongated unitary lens 22. The light rays emanating from lamp 20 impinge on lens surface 23 which condenses the light rays and directs them onto the reflective surface 24. Reflective surface 24 directs the light rays toward lens surface 25 which further condenses and directs them through a window 26 onto document 10. Lens 22 directs the light beams to the marking areas 14 of document 10 at an acute angle of incidence 27. Light which is specularly reflected from document 10 will return through window 26 at an angle of reflection 28 which is equal to the angle of incidence 27. Thus, the specularly reflected light is directed away from light-sensitive elements 29 which are mounted substantially perpendicular to the marking areas 14 as they are scanned through window 26. Positioning of the light-sensitive elements 29, as hereinbefore described, will allow the light-sensitive elements to sense only the diffuse-reflected light. Diffuse-reflected light is that light which is scattered in all directions.

The light beams emanating from the unitary lens 22 will simultaneously illuminate all the marking areas 14 and the timing mark 18 of a single column 12 as the column is transported past window 26. It is necessary, therefore, to provide a light-sensitive element 29 for each of the discrete areas to be sensed to enable the read head 11 to simultaneously sense any information recorded in the illuminated column.

The mounting of the light-sensitive elements 29 is accomplished by using an elongated block 31 which forms a plurality of individual pockets 32 separated from each other by barriers 33. The light-sensitive elements 29 are mounted one within each pocket on ledges 34 projecting inwardly from barriers 33.

Block 31, with the light-sensitive elements 29 assembled in it, as shown in FIG. 4, is mounted on a body member 35 so that the light-sensitive elements 29 project into an opening 36 formed in body member 35. Opening 36 is of sufficient size to house an electrical cable 39 formed of lead wires 38 of each of the elements 29. The unitary lens 22 is mounted within a second opening 37 formed in body member 35. Clamp 40 mounted on body member 35 is provided with a bevel surface 41 which holds one edge of window 26, the other edge being held by a V-shaped notch 42 formed in mounting block 31, as shown in FIG. 2.

Complete shielding of elements 29 from undesirable light sources is accomplished by the novel construction of pockets 32 in conjunction with a suitable sealant 43 and opaque tape 44.

The sealant may be any silicone rubber encapsulant such as that marketed by the General Electric Company under the designation RTV-102. The sealant is employed not only as a light shield but also as a means to affix elements 29 within the pockets 32, and to seal the ends of window 26 from dust.

The opaque tape as best seen in FIG. 2 is installed between the unitary lens 22 and the mounting block 31 to prevent any random light rays emanating from the unitary lens from reaching the elements 29.

Window 26 is preferably made from an optically clear synthetic sapphire, which is a hard, scratch-resistant material and is particularly useful in this application since the documents rub the window as they are transported past the read head.

It may be seen that the design of the mark-read head 11, as hereinbefore described, has resulted in a completely sealed dust-free unit. The only surface requiring cleaning is lens surface 23, which is easily accessible. Window 26 requires no cleaning as it is constantly being cleaned by the documents rubbing over it as they pass the mark-read head.

Lamp 20 has a long-life tungsten filament which does not darken appreciably with age. The lamp is encapsulated in quartz and operates at a high temperature which tends to burn off any dust which may accumulate on its bulbular surface. A lamp suitable for this application and possessing the hereinbefore-described characteristics is marketed by the General Electric Company and is identified in the GE Lamp Department catalog under the No. Q45/T2 ½/CL/7V.

While the principles of the invention have now been made clear in a preferred embodiment, there will be immediately obvious to those skilled in the art many modifications of structure, arrangement, proportions, the elements, materials, and components used in the practice of the invention, and otherwise which are particularly adapted for specific environments and operating requirements without departing from these principles. The appended claims, therefore, intend to cover and embrace any such modifications within the limits only of the true spirit and scope of the invention.

What I claim is:

1. An optical read-head for sensing a plurality of marking areas on a document and producing signals in response to the presence or absence of marks in the areas comprising:
   a. a housing;
   b. a light source mounted on said housing;
   c. an elongated single lens formed with a cylindrical light-receiving lens surface, an angularly disposed internal reflective surface, and a cylindrical light-disbursing lens surface, said lens mounted in said housing and positioned to receive and direct the light from said source onto the marking areas of the document at an acute angle of incidence;
   d. a plurality of light-sensitive elements mounted within said housing and positioned between the angle of incidence and the angle of reflection such that said light-sensitive elements sense the amount of diffused light reflected from said document and produce a signal representative thereof; and
   e. shielding means positioned between said lens and said light-sensitive elements to prevent undesired light rays from reaching said sensing elements.

2. A sealed optical read head for sensing a plurality of marking areas on a document and producing signals in response to the presence or absence of marks in the areas comprising:
   a. a housing having an opening formed therethrough;
   b. a light source mounted on said housing;
   c. a window mounted for closing one end of the opening;
   d. an elongated single lens formed with a cylindrical light-receiving lens surface, an angularly disposed internal reflective surface, and a light-disbursing lens surface, said lens mounted for closing the other end of the opening, said lens adapted for receiving and directing light rays from said light source through said window and onto the marking areas of the document at an acute angle of incidence;
   e. a plurality of light-sensing elements mounted within individual pockets provided in said housing, one of said light-sensing elements for each of the areas to be sensed, said light-sensing elements positioned substantially perpendicular to said window between the angle of incidence and the angle of specular reflection whereby said light-sensing elements sense diffused light reflected from the marking areas;
   f. shielding means positioned between said lens and said light-sensing elements to shield said elements from undesired light rays; and
   g. sealing means within the opening in said housing to provide substantially dust-free operation.

3. A sealed optical read head as claimed in claim 2 wherein said shielding means comprises an elongated strip of opaque tape.

4. A sealed optical read head as claimed in claim 2 wherein said sealing means comprises an encapsulant which affixes said light-sensing elements within said individual pockets and provides additional shielding of said light-sensing elements from random light rays.